S. INGERSOLL.
Hose-Couplings.

No. 140,830. Patented July 15, 1873.

Witnesses:
A. Bennerkendorf.
C. Sedgwick

Inventor:
S. Ingersoll
Per
Attorneys.

UNITED STATES PATENT OFFICE.

SIMON INGERSOLL, OF STAMFORD, CONNECTICUT.

IMPROVEMENT IN HOSE-COUPLINGS.

Specification forming part of Letters Patent No. 140,830, dated July 15, 1873; application filed May 31, 1873.

*To all whom it may concern:*

Be it known that I, SIMON INGERSOLL, of Stamford, in the county of Fairfield and State of Connecticut, have invented a new and Improved Hose-Coupling, of which the following is a specification:

My invention consists of a couple of short sections of metal tube, which couple together by a screw-collar swiveled onto one of them, and in connection therewith each section is provided with a clamp composed of two semicircular parts connected together by flanges and bolts for clamping the hose on the metal tubes, which said clamps are attached to the metal tubes by stud-pins, which prevent the hose from slipping off the metal tubes endwise as when clamped thereto by the ordinary two-part metal clamps not connected to the metal tubes. Moreover, by this connection the parts are kept together when the hose is not clamped on.

Figure 1:
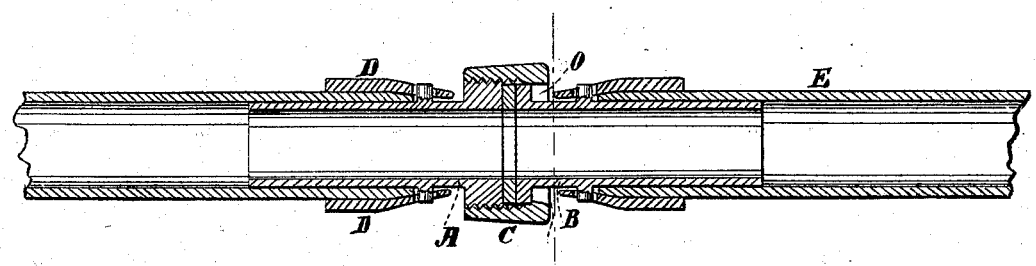
Figure 2:
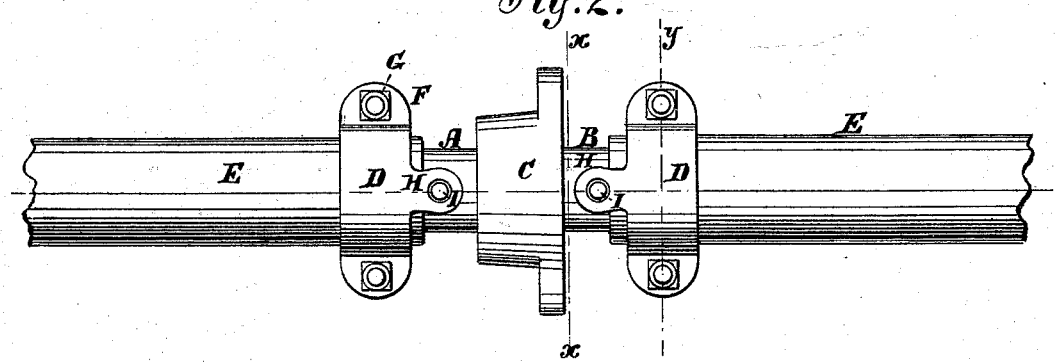
Figure 3:
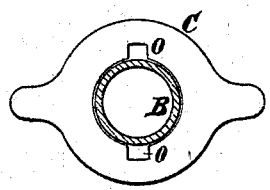
Figure 4:
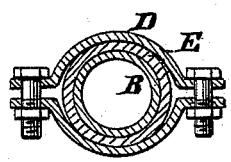

Figure 1 is a longitudinal sectional elevation of my improved hose-coupling. Fig. 2 is a plan view. Fig. 3 is a section on the line $x\,x$, Fig. 2. Fig. 4 is a section on the line $y\,y$.

A and B are the two metal sections of tube, which are connected by the screw-collar C, which is swiveled onto B and screws onto A. D represents the two semicircular parts of the clamps for clamping the hose E onto the metal tubes. They are clamped together by the ears F and bolts G, and they are provided with an ear, H, which receives a stud-pin, I, projecting from the side of the tube in its hole, so as to resist any lengthwise strain of the hose tending to pull it off the tube, to which the hose is often subject, and by which it is very often stripped off when clamped in the ordinary way—that is, without the stud-pins I and ears H. The pressure of the water or steam also tends to pull it off.

This hose is largely used in steam drilling-machines which are often run in situations rendering their operation very expensive, so that any delay caused by the slipping of the hose off the couplings entails considerable loss of time and money.

In order to apply the collar C to the tube B above the stud-pins I its flange has a couple of notches, O, to allow the stud-pins to pass through it.

Having thus described my invention, I claim as new and desire to secure by Letters Patent—

The combination, with the metal pipe-sections A B, coupled together as described, of the clamps D F G connected to them by ears and stud pins, substantially as specified.

SIMON INGERSOLL.

Witnesses:
  C. G. CHILD,
  A. C. TODD.